United States Patent [19]

Lardellier

[11] Patent Number: 4,940,196
[45] Date of Patent: Jul. 10, 1990

[54] WING MOUNTING NACELLE FOR A VERY HIGH BY-PASS RATIO TURBOJET AERO-ENGINE

[75] Inventor: Alain M. J. Lardellier, Melun, France

[73] Assignee: Societe Nationale d'Etude et de Construction de Moteurs d'Aviation S.N.E.C.M.A., Paris, France

[21] Appl. No.: 263,874

[22] Filed: Oct. 28, 1988

[30] Foreign Application Priority Data

Oct. 28, 1987 [FR] France .................. 87 14898

[51] Int. Cl.$^5$ .......................................... B64D 27/18
[52] U.S. Cl. ...................................... 244/54; 60/39.31
[58] Field of Search ............... 244/53 R, 54; 248/554; 60/226.1, 226.2, 226.3, 39.31

[56] References Cited

U.S. PATENT DOCUMENTS

| | | | |
|---|---|---|---|
| 3,979,087 | 9/1976 | Boris | 244/54 |
| 4,055,041 | 10/1977 | Adamson et al. | 244/54 |
| 4,147,029 | 4/1979 | Sargisson | 244/54 |
| 4,449,682 | 5/1984 | Cratzer et al. | 244/54 |
| 4,506,850 | 3/1985 | McConnell | 244/56 |

FOREIGN PATENT DOCUMENTS 2560854 9/1985 France .

Primary Examiner—Joseph F. Peters, Jr.
Assistant Examiner—Anne Sartelle

Attorney, Agent, or Firm—Oblon, Spivak, McClelland, Maier & Neustadt

[57] ABSTRACT

A nacelle for mounting under the wing of an aircraft a turbojet engine unit of the rear contrafan type with a very high by-pass ratio, the engine including a gas generator driving two overlapping contra-rotating turbines integral with ducted contra-rotating propellers downstream of the gas generator. The nacelle includes generally cylindrical inner and outer cowlings defining the secondary flow path containing the propellers, and a mast for suspending the engine unit comprising a pair of arms disposed in the longitudinal vetical axial plane of the engine unit and contained in a fairing, and a horizontal carrier beam fixed to the lower ends of the arms and disposed between the inner cowling and the engine casing. The upper ends of the arms are fixed to a box structure of the wing either directly or through a conventional engine pod suspension mast. In the former case the thickness of the outer cowling is integrated into the thickness of the wing, and the outer side of the cowling merges with the lower wing surface by means of a Karman type profile evolving in a direction from upstream to downstream in such a manner that, in an axial longitudinal plane vertically through the longitudinal axis of the engine unit, the generatrix defining the inner side of the outer cowling is overall tangential to the lower wing surface. The inner and outer cowlings are each divided into 120° sectors, the lower two of which can be pivoted outwards and upwards to simplify maintenance.

10 Claims, 7 Drawing Sheets

WING MOUNTING NACELLE FOR A VERY HIGH BY-PASS RATIO TURBOJET AERO-ENGINE

BACKGROUND OF THE INVENTION

1. Field of the invention

The present invention relates to the mounting of turbojet engine units under the wings of aircraft and to nacelles adapted for this purpose.

2. Summary of the prior art

It is known to mount front-fan turbojet by-pass engines under the wings of an aircraft, at the end of a mast suspended from the wing. Such an example is disclosed in French Patent No. 2560 854. This is possible for engines in which the by-pass ratio is between 5 and 10, which results in fan diameters still compatible with a relatively low drag of the nacelle.

Turbojet engine units with very high by-pass ratios have since been made, in which a gas generator drives free contra-rotating turbines which are themselves integral with large, non-ducted contra-rotating propellers. Such engines permit by-pass flow ratios of between 30 and 40 which gives rise to the hope of gains of from 20 to 25% on fuel consumption. The drawback of these engines lies in the large diameter of their propellers which has made it necessary until now to place turbojet engine units of this type laterally on the fuselage of the aircraft, thus restricting their use to a twin-engine formula.

Also under study are engines with very high by-pass ratios (about 15) having single or contra-rotating ducted propellers, which, compared with engines having non-ducted propellers should reduce propeller noise and permit an easier mounting of this type of engine under the wing of an aircraft, as the diameter of the propellers is smaller. Indeed, in practice wing mounting is a necessity for aircraft having more than two engines, such as long range aircraft.

However, in such engines with ducted contra-rotating propellers, the theoretical gain in fuel consumption is almost completely nullified by the correlative increase in the mass and drag of the engine. Indeed, calculations show that heavy carrier aircraft equipped with very high by-pass ratio engines with contra-rotating ducted propellers gain only a few hundred km flying range over a flight of 9000 km as a result of the fact that the actual overall gain in fuel consumption is only 2 or 3% because of the increase in the drag and mass of the engines. For such engines to become competitive it is necessary that substantial improvements should be made on their drag.

Accordingly, it is an object of the present invention to achieve this, while at the same time providing a nacelle structure making it possible to mount such engines under the wings of an aircraft, and no longer only on the sides of the aircraft fuselage.

Another object of the invention is to provide a nacelle having a cowling which facilitates the maintenance of engines of this type, whether they are attached directly under the wing as proposed in one of the embodiments of the invention, or are pod-mounted in a conventional manner, i.e. spaced from the wing, as proposed in an alternative embodiment of the invention.

A further object is to provide a nacelle for these engines including movable flaps for controlling the opening of the secondary nozzle according to flight conditions and incorporating a flow reverser of simple construction.

SUMMARY OF THE INVENTION

According to the invention, there is provided a nacelle for a turbojet by-pass engine unit of the rear contrafan type having a very high by-pass ratio and including a gas generator, two overlapping free contra-rotating turbines driven by the gas generator, an engine casing surrounding the gas generator and the turbines, and two ducted contra-rotating propellers rigid with the turbines downstream of the gas generator and disposed in the cold flow path of the engine unit outwardly of the engine casing, the nacelle mounting the turbojet engine unit under the wing of an aircraft and including an inner cowling of generally cylindrical shape surrounding the engine casing and forming the inner wall of the cold flow path, the inner cowling being openable for carrying out maintenance work, an outer cowling which is also of generally cylindrical shape and which has an inner side defining the outer wall of the cold flow path and an outer side forming the exterior of the nacelle, a mast for suspending said turbojet engine unit, the mast including two arms disposed in a vertical plane containing the longitudinal axis of said turbojet engine unit, the arms having upper and lower ends, and a fairing containing the arms, joining means connecting said upper ends of said arms to a box structure of the aircraft wing, and a horizontal carrier beam disposed longitudinally between the engine casing and the inner cowling, said carrier beam being rigidly connected to the lower ends of the arms.

According to one embodiment, the upper ends of the mast arms are joined to the box structure of the aircraft wing by means of an aircraft engine pod suspension mast of a conventional type, and the upper part of the outer cowling merges with said engine pod suspension mast.

According to another embodiment of the invention, the upper ends of the mast arms are rigidly connected directly to the box structure of the wing, and the thickness of the outer cowling between the inner and outer sides thereof at its upper part is integrated into the thickness of the aircraft wing, the outer side of the outer cowling merging with the lower surface of the wing by means of a Karman type profile evolutive in a direction from upstream to downstream, and, in an axial longitudinal plane situated to the vertical of the longitudinal axis of the turbojet engine unit, the generatrix defining the inner side of the outer cowling being tangential overall to the lower wing surface seen in longitudinal section.

In either of these embodiments a particularly advantageous arrangement is obtained when the outer cowling comprises two shells of about a 120° angle mounted on longitudinal hinges so that the shells can be opened for maintenance, thus providing outstanding accessibility to the propellers and engine section.

Furthermore, the turbojet engine unit is preferably suspended from the carrier beam, the upstream end of the beam being connected to the engine casing in line with the inlet guide vanes of the engine, and the downstream end of the beam being connected to the transition structure disposed between the low pressure turbine and the free turbines. In this case, when the shells of the outer cowling are open it is easy to demount the engine from the carrier beam and lower it vertically by means of block and tackle, the outer cowling remaining on the aircraft.

Further characteristics of the invention will become apparent from the following description with reference to the accompanying drawings.

DESCRIPTION OF THE PREFERRED EMBODIMENTS

Figure 1:
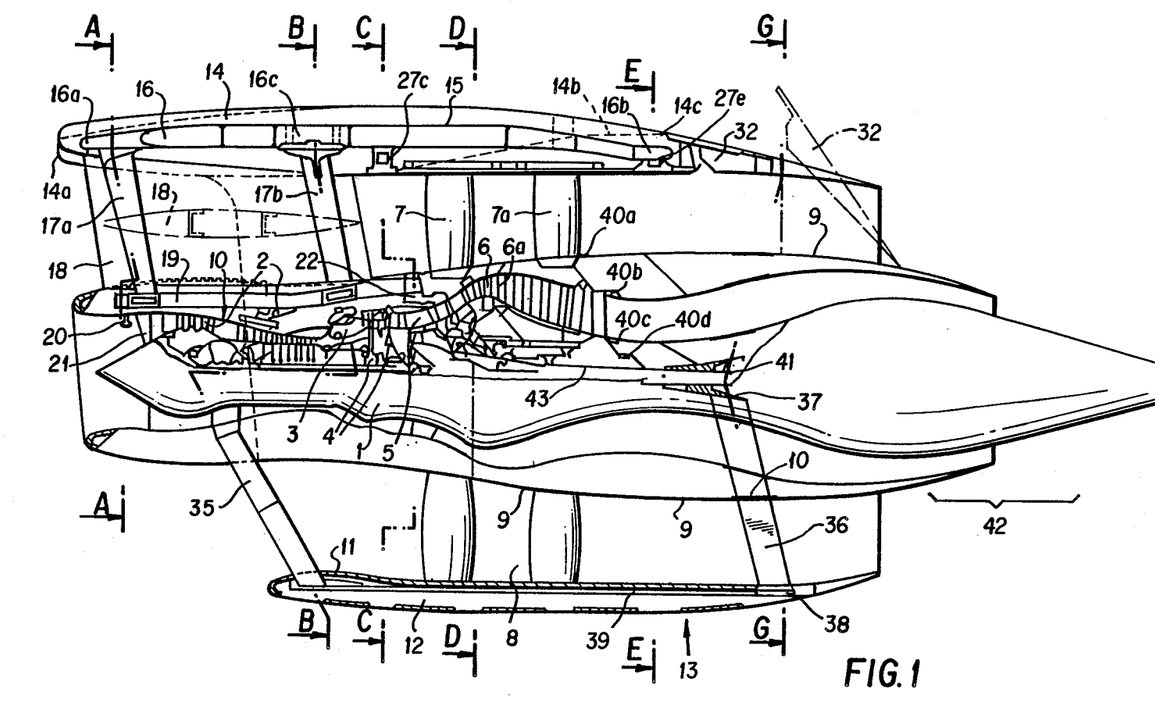
FIG. 1 is a longitudinal axial sectional view of one embodiment of a turbojet engine unit of the rear contra-fan type in accordance with the invention, having its nacelle integrated with the wing of an aircraft.

In FIG. 1 a turbojet engine unit 1 is shown comprising a double-body gas generator consisting of two compressors 2 delivering compressed air to an annular combustion chamber 3 where it is mixed with fuel, this mixture being burnt for expansion to supply part of the energy thus accumulated to two high and low pressure turbines 4 driving the compressors 2. Downstream of this gas generator and after a fixed transition structure 5 there are mounted two overlapping free counter-rotational turbines 6 and 6a which receive the energy of the expanded gases downstream of the turbine 4 to drive two contra-rotational propellers 7 and 7a churning cold air in an annular secondary flow path 8 surrounding an inner cowling 9 which is of generally cylindrical shape and is itself arranged around the motor casing 10. The secondary flow path 8, inwardly delimited by the inner cowling 9, is externally delimited by the inner side 11 of an outer cowling 12 forming the exterior of the nacelle 13.

Having thus briefly described the turbojet engine unit, a first method of mounting it under the wing of an aircraft as well as the construction of the cowlings will now be described with reference to FIGS. 1 to 8.

The wing 14 has a box structure 15 including in the longitudinal plane of the engine a longitudinal box girder 16 of which the upstream portion 16a is completely integrated inside the leading edge 14a of the wing, and the downstream portion 16b passes through the lower wing surface 14b and extends under the lower wing surface as far as the area in line with the trailing edge 14c of the wing.

Suspended from the upstream portion 16a and a central portion 16c of the girder 16, are two arms 17a and 17b which are contained in a spindle-shaped fairing 18 and which have their lower ends fixed to a horizontal carrier beam 19 mounted between the engine casing 10 and the inner cowling 9. The turbojet engine is suspended from this carrier beam 19 at its upstream end by means of three small rods 20 in the region of the input guide vanes 21 and at the downstream end by three small rods 22, the rods 20 and 22 being suspended from upstream and downstream transverse supporting arms 23 and 24 respectively which are rigidly fixed to the carrier beam.

Figures 2, 5A:
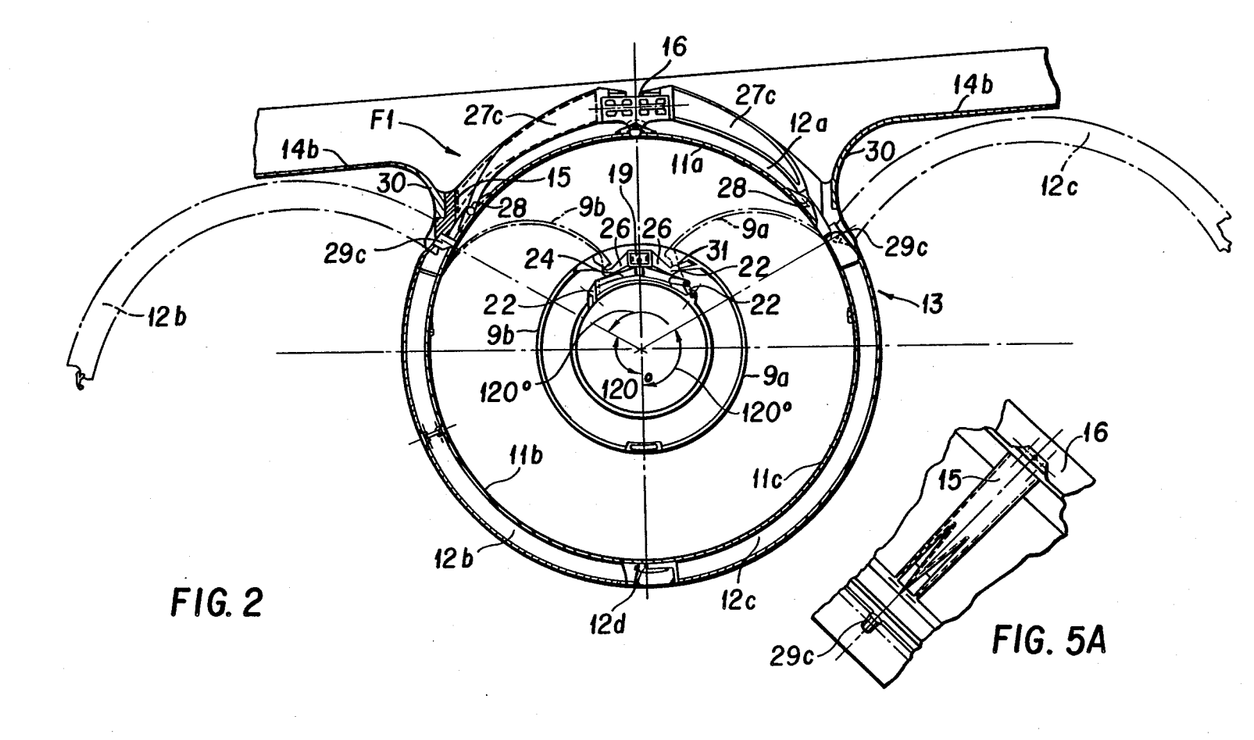
FIG. 2 is a cross-sectional view along line C in FIG. 1.
FIG. 5a is a partial view looking in the direction of arrow F1 in FIG. 2, showing the detail of the suspension of the nacelle from the wing structure.
Figure 3:
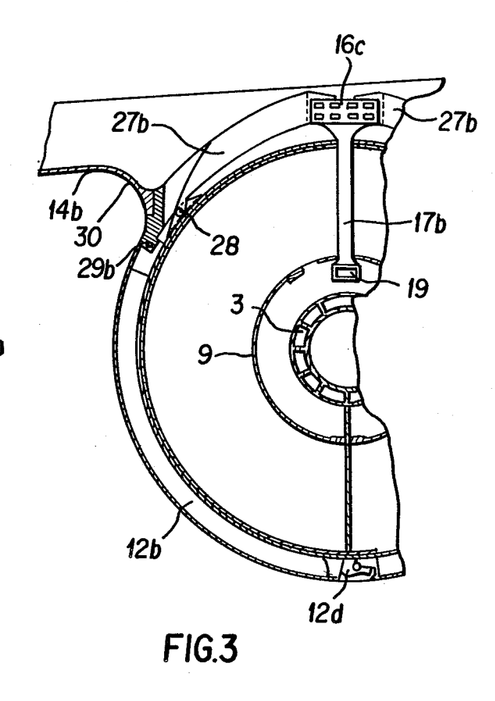
FIG. 3 is a semi-cross-sectional view along line B in FIG. 1.
Figure 4:
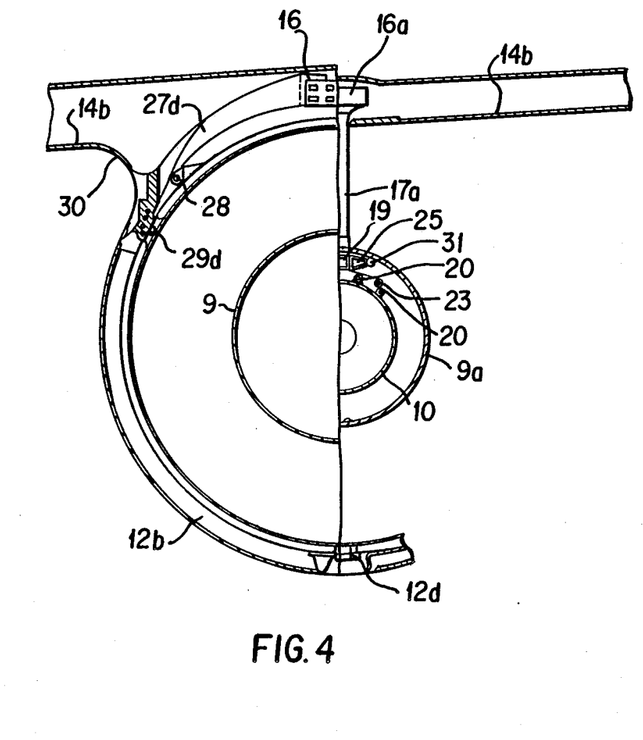
FIG. 4 is a cross-sectional view showing on the left-hand side a semi-section along line D in FIG. 1, and on the right-hand side a semi-section along line A in FIG. 1, these sections being cut off in the region of the axial longitudinal vertical plane of the engine nacelle.
Figure 5:
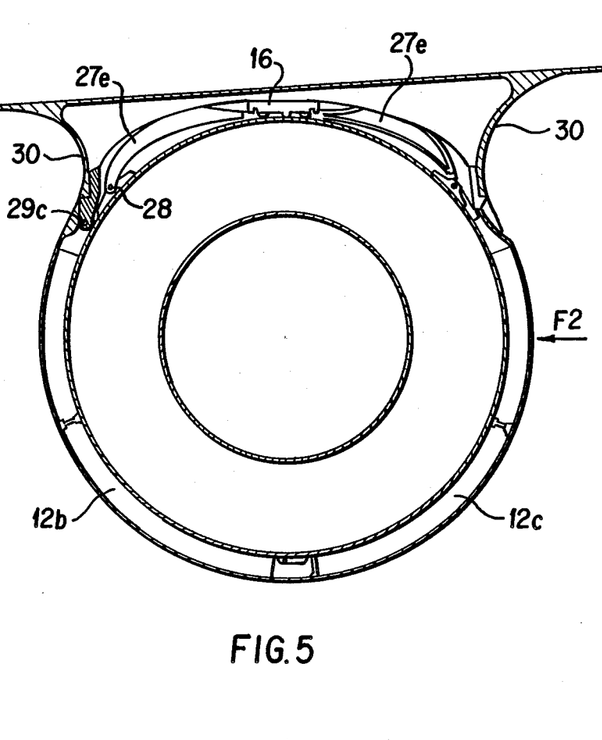
FIG. 5 is a cross-sectional view taken along line E in FIG. 1.
Figures 6, 7, 8:
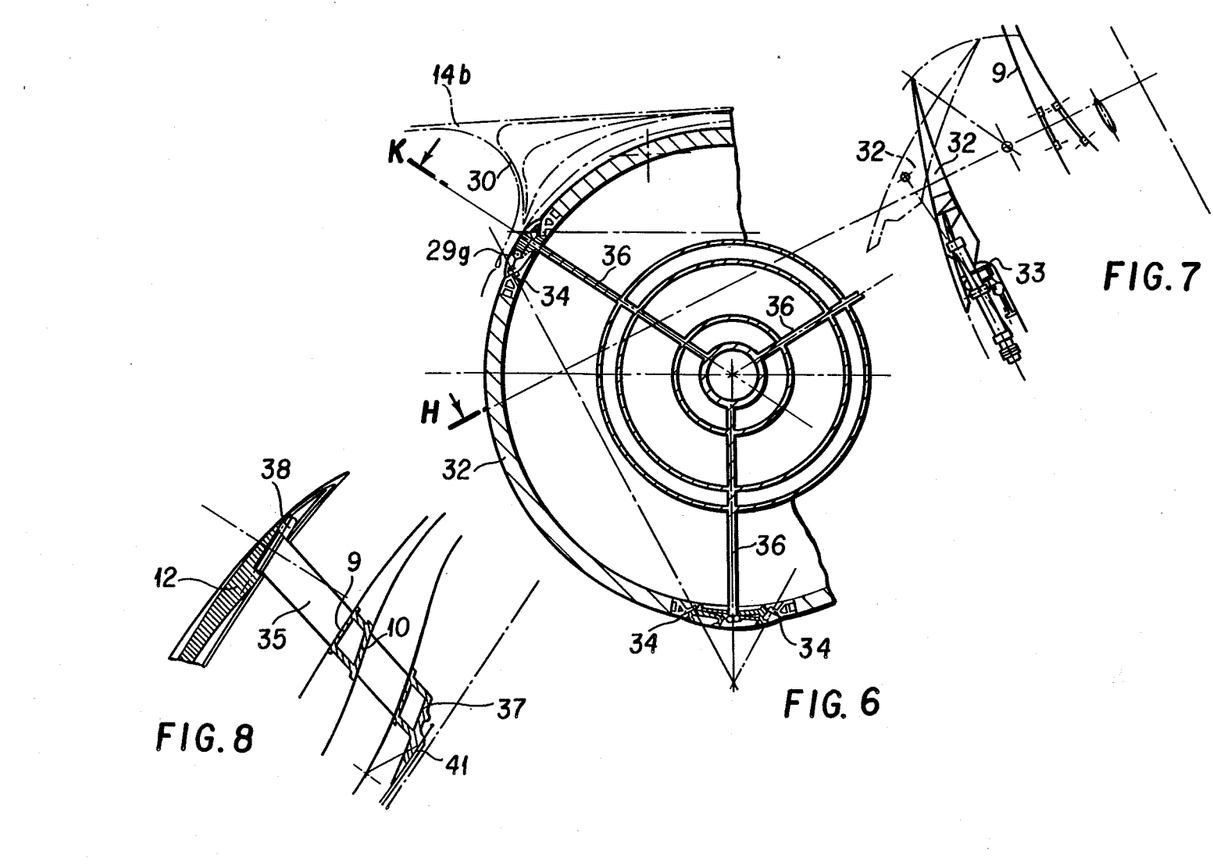
FIG. 6 is a partial cross-sectional view taken along line G in FIG. 1, in the region of downstream flaps of the nacelle which ensure optimization of the secondary nozzle cross-section and a flow reversal function.
FIG. 7 is a partial sectional view taken along line H in FIG. 6 showing the flap actuators and the kinematics of the movement of the said flaps.
FIG. 8 is a partial sectional view taken along line K in FIG. 6 in the axial longitudinal plane separating the upper sector of the nacelle and one of the lateral sectors, being a plane in which is situated a structural arm which joins the inner and outer cowlings and also joins the engine casing and the central cone to the rear bearing of the engine.

The carrier beam also has upstream lugs 25 on which the movable cowls 9a,9b of the inner cowling 9 are hinged, the cowls also being hinged at the downstream end of the carrier beam on downstream supports 26 integral with the beam (FIG. 2).

The outer cowling 12 of the nacelle 13, including its inner wall 11, is divided into three sectors 12a, 12b, 12c of about 120° each, the upper sector 12a being symmetrical relative to the longitudinal vertical plane of the engine 1.

In line with the propellers the outer cowling is provided with retaining structures 39 (FIG. 1) which permit the absorption of energy should one of the propeller blades break. The inner wall 11a of the upper sector 12a is suspended by means of axles 28 from double transverse brackets 27b, 27c, 27d, 27e which are integral with the beam 16 and are respectively situated in the sectional planes B, C, D, E, the brackets 27c and 27e thus being arranged respectively upstream and downstream of the contra-rotating propellers.

The two lower sectors 12b and 12c are pivotable about hinges 29 b,c,d,e on the box structure 15 of the wing, of which a partial view is shown in FIG. 5a, the structure merging laterally to the lower wing surface 14b through a Karman profile 30, with evolution from upstream to downstream. By means of the hinges 29b to 29e the two shells 12b and 12c can open outwards and upwards so as to allow access to the engine, or can be closed and bolted together at the bottom by known bolting means.

Similarly the sectors 9a and 9b of the inner cowling 9 may be pivoted at 31 (FIGS. 2 and 4) so as to permit access to the engine.

Movable flaps 32 are arranged downstream of the contra-rotating propellers 7, 7a on at least the two lower sectors 12b, 12c of the outer cowling. In the example shown, where the cowling extends rearwards of the trailing edge 14c of the wing, the upper sector 12a of the cowling also has a movable flap 32. Each of these flaps is movable by two screw actuators 33 (shown in FIG. 7 and arranged within the thickness of the cowling at 34, FIG. 6) from a first position in which the flaps are aligned with the outer cowling (as shown in full lines in FIGS. 1 and 7) towards a second, intermediate position folded in towards the axis of the engine (shown in dot-and-dash lines in FIG. 7) so as to enable the flow cross-section of the secondary nozzle to be varied with a view to optimizing the by-pass ratio as a function of the operating parameters of the engine.

By means of the actuators 33 and suitable kinematics the flaps 32 may also be moved downstream and in rotation from their first or second position to a third position (shown in dot-and-dash lines in FIG. 1) where they are completely folded inwards to the inner cowling 9 and uncover grilles of the outer cowling (not shown). In this third position the flaps 32 act as thrust reverser gates for the secondary flow of the engine.

A similar arrangement with smaller flaps which scoop outwards could be adopted if the propellers have a variable setting. The intermediate positions of the flaps are no longer useful as the variable setting enables regulation of the engine. The fully open position of the flaps promotes the reverse flow of air when the propellers are in the thrust reversal setting.

The nacelle assembly is stiffened upstream by a radial structural arm 35 which passes through, and is rigidly connected to, the engine casing and the inner and outer cowlings. Downstream, three structural arms 36 at 120° and two casing rings 10 and 37 (FIGS. 1, 6 and 8) are designed to stiffen the structure 12b and 12c, and to stabilize the inner shaft 43 of the engine. To allow for expansion the structural arms 36 are slidable at their outer ends on axles 38 arranged parallel to the engine axis. Use is also made of this sliding facility when the engine is demounted. To disengage the centerings and labyrinths 40a, b, c, d, the coupling 41 of the casing 37 to the engine shaft is disconnected, and the central rear body 42 is pushed back, the cowling sectors 12b and 12c being open. The engine can then be lowered from the carrier beam as described earlier, the central rear body remaining on the aircraft. It will be sufficient to open the cowling sectors 9a, 9b and 12b, 12c to have perfect access to the propellers and to the gas generator for standard maintenance operations. The complete structure enables substantial gains in fuel consumption to be achieved by reducing the drag of the nacelle, facilitates maintenance of the engine through the laterally opening cowling sectors, and permits the integration of an effective thrust reverser with the rear contrafans.

Figure 1A:
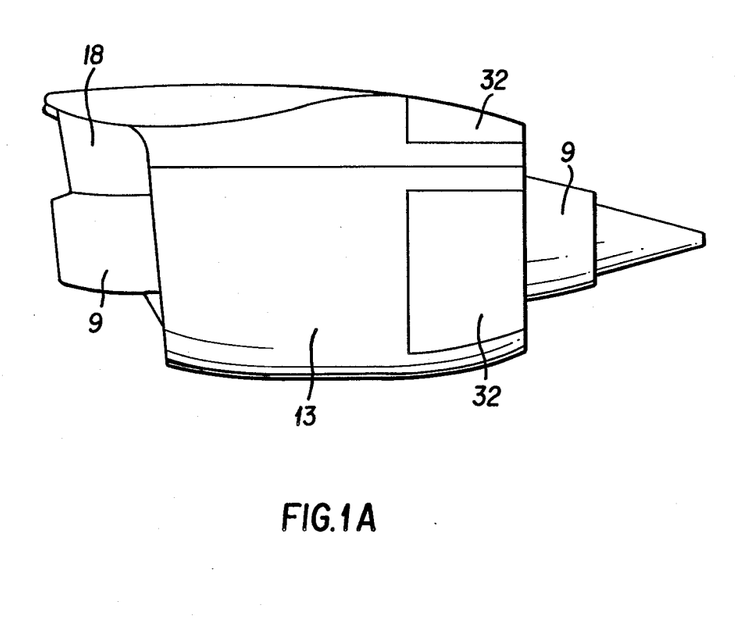
FIG. 1a is a diagrammatic view of the nacelle looking in the direction of arrow F2 in FIG. 5.
Figure 9:
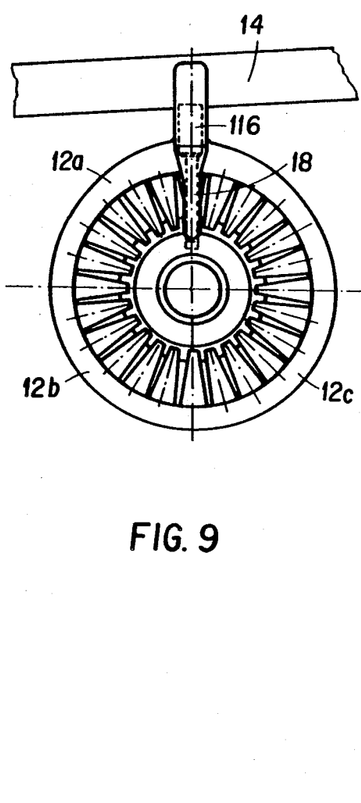
FIG. 9 shows, from an upstream position, an embodiment of a turbojet engine unit in accordance with the invention suspended under the wing of an aircraft by means of a pod mounting comprising a suspension mast of a conventional type.
Figure 10:
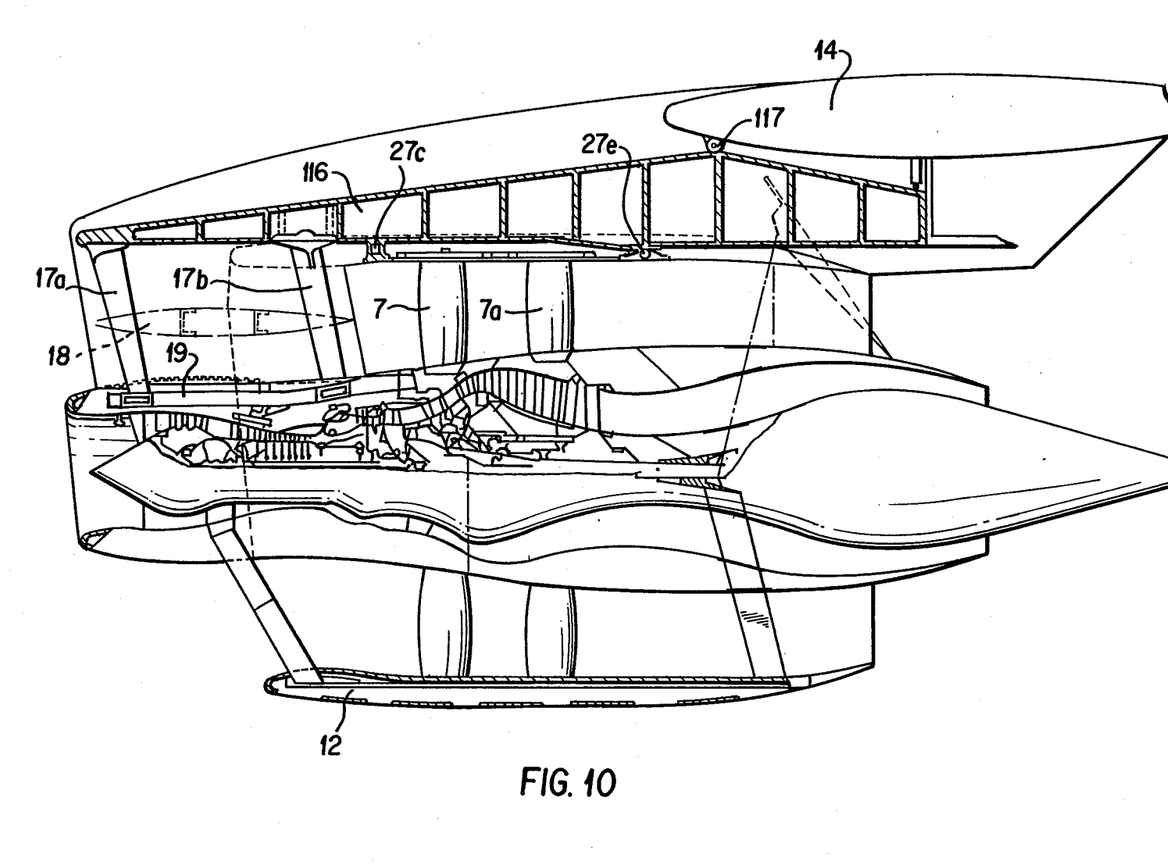
FIG. 10 is a longitudinal axial sectional view similar to that of FIG. 1 but of the pod-mounted turbojet engine unit shown in FIG. 9; and, FIG. 10a is a diagrammatic side view of the nacelle of the pod-mounted engine of FIGS. 9 and 10.
Figure 10A:
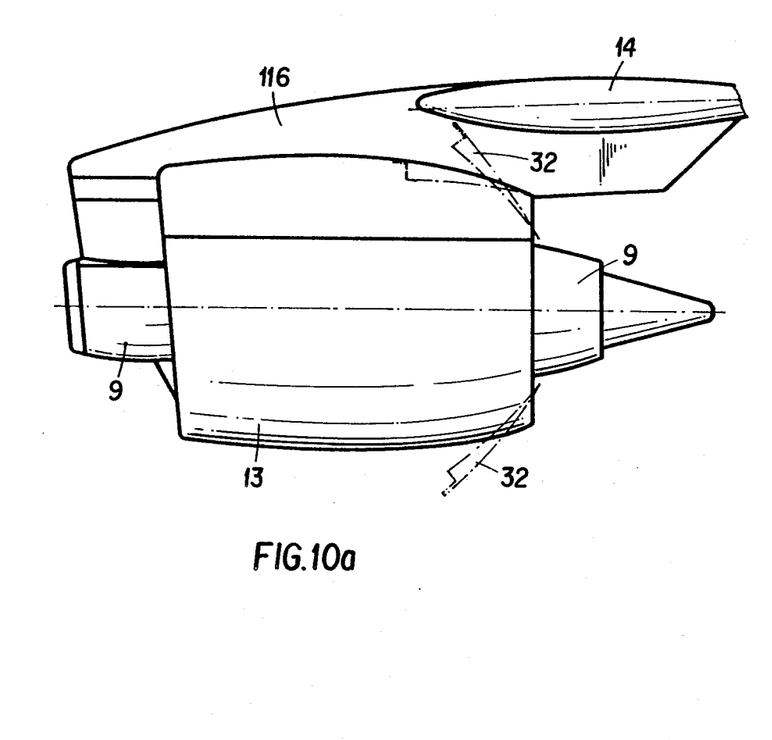

A second method of mounting the turbojet engine under the wing of the aircraft will now be described with reference to FIGS. 9, 10 and 10a. With respect to the arrangement described above, the turbojet engine unit remains essentially unchanged, and the figure references relating to the engine and the nacelle are identical to those of the corresponding FIGS. 1 and 1a of the preceding embodiment.

In this second method the nacelle is pod-mounted in a standard manner. An engine pod support mast 116 is suspended from the structural girder 16 of the wing 14 by means of axles 117 and a standard type of suspension structure which is not be specifically described. The upper part 12a of the nacelle is then connected by the upper ends of the arms 17a and 17b and by the double transverse brackets 27b, 27c to the bottom part of the mast 116.

The remainder of the nacelle is the same as in the previous embodiment and the utilization of the arrangements in accordance with the invention relating to the opening cowlings provides a pod nacelle having the same qualities of ease of maintenance.

In addition, in this embodiment, the fact that the engine is spaced from the lower surface of the wing by the height of the mast 116 makes it possible to construct a flow reverser having two, three or four swiveling gates 32, depending on the needs of the aircraft operator, which improves the efficiency of the reverse without disturbing the flow along the lower surface of the wing.

What is claimed is:

1. A nacelle for a turbojet by-pass engine unit of the rear contrafan type including a gas generator, two overlapping free contra-rotating turbines driven by said gas generator, an engine casing surrounding said gas generator and said turbines, and two ducted contra-rotating propellers rigid with said turbines downstream of said gas generator and disposed in a cold flow path of the engine unit outwardly of said engine casing, said nacelle mounting said turbojet engine unit under the wing of an aircraft and comprising:
   an inner cowling of generally cylindrical shape surrounding said engine casing and forming the inner wall of said cold flow path, said inner cowling being openable to provide access to said engine,
   an outer cowling which is also of generally cylindrical shape and which has an inner side defining the outer wall of said cold flow path and an outer side forming the exterior of the nacelle,
   a mast for suspending said turbojet engine unit, said mast comprising two arms disposed in a vertical plane containing the longitudinal axis of said turbojet engine unit, said arms having upper and lower ends, and a fairing containing said arms,
   joining means for connecting said upper ends of said arms to a box structure of said aircraft wing, and
   a horizontal carrier beam disposed longitudinally between said engine casing and said inner cowling, said carrier beam being rigidly connected to said lower ends of said arms wherein said outer cowling is divided into three 120° sectors, one of said sectors being disposed uppermost and symmetrically relative to an axial vertical longitudinal plane of the turbojet engine unit and each of said sectors extend from a front portion to a rear portion of said outer cowling, and wherein two lateral sectors of said outer cowling comprise movable cowls which can be pivoted laterally about longitudinal pivot hinges fixed on said upper sector and wherein longitudinal edge portions of said lateral sectors can be connected together at a bottom portion thereof in a closed position and said outer cowling includes an annular retaining structure.

2. A nacelle according to claim 1, wherein said joining means comprises an aircraft engine pod suspension mast of conventional type, and the upper part of said outer cowling merges with said engine pod suspension mast.

3. A nacelle according to claim 1, wherein at least two of said sectors of said outer cowling include flaps disposed downstream of said contra-rotating propellers, said flaps being rotatable between a first position in which they are aligned with said outer cowling and a second position in which they are directed inwards towards the axis of the turbojet engine to vary the section of the secondary nozzle.

4. A nacelle according to claim 3, wherein said flaps are also movable in translation and in rotation from said first position to a third position in which they extend inwards completely to said inner cowling and uncover grilles in said outer cowling so as to reverse the thrust of the secondary flow.

5. A nacelle according to claim 1, including a structural casing which is slidable on the central rear body of the engine unit thereby clearing said inner cowling.

6. A nacelle for a turbojet by-pass engine unit of the rear contrafan type including a gas generator, two overlapping free contra-rotating turbines driven by said gas generator, an engine casing surrounding said gas generator and said turbines, and two ducted contra-rotating propellers rigid with said turbines downstream of said gas generator and disposed in a cold flow path of the engine unit outwardly of said engine casing, said nacelle mounting said turbojet engine unit under the wing of an aircraft and comprising:
  an inner cowling of generally cylindrical shape surrounding said engine casing and forming the inner wall of said cold flow path, said inner cowling being openable to provide access to said engine,
  an outer cowling which is also of generally cylindrical shape and which has an inner side defining the outer wall of said cold flow path and an outer side forming the exterior of the nacelle,
  a mast for suspending said turbojet engine unit, said mast comprising two arms disposed in a vertical plane containing the longitudinal axis of said turbojet engine unit, said arms having upper and lower ends, and a fairing containing said arms,
  joining means for connecting said upper ends of said arms to a box structure of said aircraft wing, and
  a horizontal carrier beam disposed longitudinally between said engine casing and said inner cowling, said carrier beam being rigidly connected to said lower ends of said arms wherein said joining means rigidly connects said upper ends of said mast arms directly to said box structure of said aricraft wing, and the thickness of said outer cowling between said inner and outer sides thereof at the upper part of said outer cowling is integrated into the thickness of said aricraft wing, said outer side of said outer cowling merging with the lower surface of said wing by means of a Karman type profile which is evolutive in a direction from upstream to downstream and the generatrix defining said inner edge of said outer cowling being tangential overall to said lower wing surface in an axial longitudinal plane vertically through the longitudinal axis of said turbojet engine unit.

7. A nacelle according to claim 6, including a plurality of transverse brackets suspending said outer cowling from said box structure of said wing, at least two of said brackets being disposed respectively upstream and downstream of said contra-rotating propellers.

8. A nacelle for a turbojet by-pass engine unit of the rear contrafan type including a gas generator, two overlapping free contra-rotating turbines driven by said gas generator, an engine casing surrounding said gas generator and said turbines, and two ducted contra-rotating propellers rigid with said turbines downstream of said gas generator and disposed in a cold flow path of the engine unit outwardly of said engine casing, said nacelle mounting said turbojet engine unit under the wing of an aircraft and comprising:
  an inner cowling of generally cylindrical shape surrounding said engine casing and forming the inner wall of said cold flow path, said inner cowling being openable to provide access to said engine,
  an outer cowling which is also of generally cylindrical shape and which has an inner side defining the outer wall of said cold flow path and an outer side forming the exterior of the nacelle,
  a mast for suspending said turbojet engine unit, said mast comprising two arms disposed in a vertical plane containing the longitudinal axis of said turbojet engine unit, said arms having upper and lower ends, and a fairing containing said arms,
  joining means for connecting said upper ends of said arms to a box structure of said aircraft wing, and
  a horizontal carrier beam disposed longitudinally between said engine casing and said inner cowling, said carrier beam being rigidly connected to said lower ends of said arms wherein said turbojet engine is suspended from said carrier beam, the upstream end of said beam being connected to said engine casing in line with the inlet guide vanes of said engine, and the downstream end of said beam being connected to the transition structure between the low pressure turbine and said free turbines of said engine.

9. A nacelle for a turbojet by-pass engine unit of the rear contrafan type including a gas generator, two overlapping free contra-rotating turbines driven by said gas generator, an engine casing surrounding said gas generator and said turbines, and two ducted contra-rotating propellers rigid with said turbines downstream of said gas generator and disposed in a cold flow path of the engine unit outwardly of said engine casing, said nacelle mounting said turbojet engine unit under the wing of an aircraft and comprising:
  an inner cowling of generally cylindrical shape surrounding said engine casing and forming the inner wall of said cold flow path, said inner cowling being openable to provide access to said engine,
  an outer cowling which is also of generally cylindrical shape and which has an inner side defining the outer wall of said cold flow path and an outer side forming the exterior of the nacelle,
  a mast for suspending said turbojet engine unit, said mast comprising two arms disposed in a vertical plane containing the longitudinal axis of said turbojet engine unit, said arms having upper and lower ends, and a fairing containing said arms,
  joining means for connecting said upper ends of said arms to a box structure of said aircraft wing,
  a horizontal carrier beam disposed longitudinally between said engine casing and said inner cowling, said carrier beam being rigidly connected to said lower ends of said arms wherein said joining means comprises an aircraft engine pod suspension mast, an upper part of said outer cowling merging with said engine pod suspension mast, and a plurality of transverse brackets suspending said outer cowling from said engine pod suspension mast, at least two of said brackets being disposed respectively upstream and downstream of said contra-rotating propellers.

10. A nacelle for a turbojet by-pass engine unit of the rear contrafan type including a gas generator, two overlapping free contra-rotating turbines driven by said gas generator, an engine casing surrounding said gas generator and said turbines, and two ducted contra-rotating propellers rigid with said turbines downstream of said gas generator and disposed in a cold flow path of the engine unit outwardly of said engine casing, said nacelle mounting said turbojet engine unit under the wing of an aircraft and comprising:

an inner cowling of generally cylindrical shape surrounding said engine casing and forming the inner wall of said cold flow path, said inner cowling being openable to provide access to said engine, an outer cowling which is also of generally cylindrical shape and which has an inner side defining the outer wall of said cold flow path and an outer side forming the exterior of the nacelle, a mast for suspending said turbojet engine unit, said mast comprising two arms disposed in a vertical plane containing the longitudinal axis of said turbojet engine unit, said arms having upper and lower ends, and a fairing containing said arms, joining means for connecting said upper ends of said arms to a box structure of said aircraft wing, and a horizontal carrier beam disposed longitudinally between said engine casing and said inner cowling, said carrier beam being rigidly connected to said lower ends of said arms wherein said outer cowling is divided into three 120° sectors, one of said sectors being disposed uppermost and symmetrically relative to an axial vertical longitudinal plane of the turbojet engine unit and wherein said upper sector is integrated into said wing structure and merges laterally with the lower wing surface by an evolutive Karman type profile.

* * * * *

UNITED STATES PATENT AND TRADEMARK OFFICE
CERTIFICATE OF CORRECTION

PATENT NO. : 4,940,196

DATED : July 10, 1990

INVENTOR(S) : ALAIN M.J. LARDELLIER

It is certified that error appears in the above-identified patent and that said Letters Patent is hereby corrected as shown below:

Column 7, line 43, "aricraft" should read --aircraft--.

Column 7, line 47, "aricraft" should read --aircraft--.

Signed and Sealed this

Twenty-fifth Day of February, 1992

Attest:

HARRY F. MANBECK, JR.

*Attesting Officer*        *Commissioner of Patents and Trademarks*